US011006652B2

(12) United States Patent
Shi et al.

(10) Patent No.: US 11,006,652 B2
(45) Date of Patent: May 18, 2021

(54) COFFEE ROASTING APPARATUS, COFFEE BREWING APPARATUS AND METHOD

(71) Applicant: KONINKLIJKE PHILIPS N.V., Eindhoven (NL)

(72) Inventors: Jun Shi, Eindhoven (NL); Jingwei Tan, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 278 days.

(21) Appl. No.: 15/523,979

(22) PCT Filed: Oct. 27, 2015

(86) PCT No.: PCT/EP2015/074913
§ 371 (c)(1),
(2) Date: May 3, 2017

(87) PCT Pub. No.: WO2016/071165
PCT Pub. Date: May 12, 2016

(65) Prior Publication Data
US 2017/0339973 A1    Nov. 30, 2017

(30) Foreign Application Priority Data

Nov. 5, 2014 (WO) ................ PCT/CN2014/090343
Jan. 20, 2015 (EP) ..................................... 15151856

(51) Int. Cl.
*A23F 5/04* (2006.01)
*A23N 12/12* (2006.01)
(Continued)

(52) U.S. Cl.
CPC ................ *A23F 5/04* (2013.01); *A23N 12/08* (2013.01); *A23N 12/125* (2013.01); *A47J 31/42* (2013.01); *B01D 46/00* (2013.01)

(58) Field of Classification Search
None
See application file for complete search history.

(56) References Cited

U.S. PATENT DOCUMENTS 3,615,667 A * 10/1971 Joffe ......................... A23F 5/12
426/388
3,964,175 A * 6/1976 Sivetz .................... A23F 5/046
34/589
(Continued)

FOREIGN PATENT DOCUMENTS

CA       2304324 A1    9/2000
CA       2304324 C     8/2010
(Continued)

OTHER PUBLICATIONS

J.A. Hernandez, B Heyd, C. Irles, B. Valdovinos, G. Trystram, "Analysis of the Heat and Mass Transfer During Coffee Batch Roasting", Journal of Food Engineering 78 (2007), pp. 1141-1148.
(Continued)

*Primary Examiner* — Ibrahime A Abraham
*Assistant Examiner* — Gyonghyun Bae
(74) *Attorney, Agent, or Firm* — Schott, P.C.

(57) ABSTRACT

A coffee roasting apparatus is disclosed that comprises a compartment for holding coffee beans, a heating arrangement for directing a heated air flow through the compartment during a roasting process of the coffee beans, a particulate matter sensor for detecting a peak amount of particulate matter released by the coffee beans, a timer for determining an amount of time lapsed from a start of the roasting process until the detection of the peak amount, and a controller arranged to control the heating arrangement. The controller is adapted to select a defined control time as a function of the lapsed amount of time and apply the defined control time to the heating arrangement after first cracking of the coffee beans to complete the roasting process. A coffee
(Continued)

brewing apparatus including such a coffee roasting apparatus and a method of controlling such a coffee roasting apparatus are also disclosed.

19 Claims, 9 Drawing Sheets

(51) Int. Cl.
    *A47J 31/42*     (2006.01)
    *B01D 46/00*     (2006.01)
    *A23N 12/08*     (2006.01)

(56) References Cited

U.S. PATENT DOCUMENTS

| | | | |
|---|---|---|---|
| 4,166,487 A | 9/1979 | Spies | |
| 4,326,114 A * | 4/1982 | Gerling | H05B 6/782 |
| | | | 219/701 |
| 4,349,573 A * | 9/1982 | Stefanucci | A23F 5/10 |
| | | | 426/388 |
| 4,425,720 A | 1/1984 | Elevitch | |
| 4,698,916 A * | 10/1987 | Farber | A23N 12/08 |
| | | | 34/586 |
| 4,860,461 A * | 8/1989 | Tamaki | A23N 12/10 |
| | | | 34/68 |
| 4,895,308 A * | 1/1990 | Tanaka | A47J 31/42 |
| | | | 241/65 |
| 4,922,841 A * | 5/1990 | Kent | F23G 5/008 |
| | | | 110/211 |
| 5,500,237 A * | 3/1996 | Gell, Jr. | A23F 5/046 |
| | | | 34/360 |
| 5,674,548 A * | 10/1997 | Nakamura | A23C 11/103 |
| | | | 426/481 |
| 5,944,512 A * | 8/1999 | Ludwig | A23N 12/125 |
| | | | 110/244 |
| 5,958,494 A * | 9/1999 | Tidland | A23N 12/083 |
| | | | 426/466 |
| 5,960,561 A | 10/1999 | Parodi | |
| 6,195,912 B1 * | 3/2001 | Moon | A23N 12/08 |
| | | | 34/136 |
| 6,491,872 B1 * | 12/2002 | Wick | G01N 1/2273 |
| | | | 422/548 |
| 6,839,636 B1 * | 1/2005 | Sunshine | B82Y 15/00 |
| | | | 422/82.01 |
| 6,841,185 B2 * | 1/2005 | Sargent | A23F 5/465 |
| | | | 426/443 |
| 7,285,300 B1 * | 10/2007 | Allington | A23N 12/08 |
| | | | 426/233 |
| 7,793,585 B2 | 9/2010 | Rasmussen et al. | |
| 8,127,592 B2 | 3/2012 | Konstandopoulos | |
| 8,679,561 B2 * | 3/2014 | Ludwig | A23F 5/10 |
| | | | 426/466 |
| 2002/0155210 A1 * | 10/2002 | Hardesty | A23F 5/243 |
| | | | 426/594 |
| 2006/0266229 A1 | 11/2006 | Ribich | |
| 2011/0169484 A1 * | 7/2011 | Van Zon | G01N 15/1463 |
| | | | 324/214 |
| 2014/0242239 A1 * | 8/2014 | Boggavarapu | A23F 5/26 |
| | | | 426/433 |
| 2014/0314921 A1 * | 10/2014 | Kuempel | H04L 67/10 |
| | | | 426/231 |
| 2014/0314923 A1 * | 10/2014 | Sewell | A23N 12/08 |
| | | | 426/233 |
| 2014/0370181 A1 * | 12/2014 | Young | A23F 5/02 |
| | | | 426/595 |
| 2015/0086695 A1 * | 3/2015 | Oglesby | A23L 2/60 |
| | | | 426/548 |
| 2016/0183586 A1 * | 6/2016 | Min | A23N 12/10 |
| | | | 99/324 |

FOREIGN PATENT DOCUMENTS

| | | |
|---|---|---|
| CN | 2457872 Y | 11/2001 |
| CN | 101827528 A | 9/2010 |
| CN | 103260484 A | 8/2013 |
| CN | 104026312 A | 9/2014 |
| EP | 0060062 A1 | 9/1982 |
| WO | 2014191873 A1 | 12/2014 |

OTHER PUBLICATIONS

Office Action issued in connection with corresponding 201580060417.X, dated Mar. 4, 2019, 14 pages.

\* cited by examiner

COFFEE ROASTING APPARATUS, COFFEE BREWING APPARATUS AND METHOD

This application is the U.S. National Phase application under 35 U.S.C. § 371 of International Application No. PCT/EP2015/074913, filed on Oct. 27, 2015, which claims the benefit of International Application No. PCT/CN2014/090343 filed on Nov. 5, 2014 and International Application No. 15151856.0 filed Jan. 20, 2015. These applications are hereby incorporated by reference herein.

FIELD OF THE INVENTION

The present invention relates to a coffee roasting apparatus comprising a compartment for holding coffee beans; a roasting element for roasting the coffee beans in said compartment; and a controller for controlling the roasting element.

The present invention further relates to a coffee brewing apparatus comprising such a coffee roasting apparatus.

The present invention yet further relates to a method of controlling such a coffee roasting process.

BACKGROUND OF THE INVENTION

Coffee has become one of the most popular beverages in modern society, with many different types and flavours of coffee being routinely available to a consumer, either in outlets such as coffee shops or in supermarkets for domestic use. The evolution of the popularity of coffee as a beverage has caused a shift in how coffee is being consumed, for instance in domestic settings.
Whereas in the past coffee would be predominantly brewed from instant coffee granules or from packaged ground coffee powders, e.g. using domestic coffee makers such as espresso machines or filter machines, nowadays a greater emphasis is placed on the freshness of the brewed coffee, which has triggered a rise in popularity of coffee roasting apparatuses. In such an apparatus, fresh, i.e. green, coffee beans can be roasted by a thermal process, e.g. using hot gases or by physical contact with a hot surface. During roasting at temperatures above 170° C., water is redistributed, and complex chemical reactions such as Maillard reaction and pyrolysis are induced. A fresh coffee powder can then be formed by grinding the freshly roasted coffee beans, thereby facilitating the brewing of fresh coffee. Such coffee is typically considered to have a superior taste compared to coffee brewed from packaged ground coffee powders.

The control of such a coffee roasting process is however far from trivial. Different users may require a different degree of roasting, e.g. a light roast or dark roast, of the coffee beans to cater for their personal taste. Moreover, different varieties of coffee beans will require different roasting times in order to achieve a certain roasting degree. Indeed, even different harvests of the same variety of coffee beans may exhibit variability in the required roasting times to achieve the desired degree of roasting. Therefore, one of the major challenges in providing a coffee roasting apparatus is to ensure that the roasted product meets customer expectation; e.g. has the desired degree of roasting.

Existing coffee roasting apparatuses such as the Nesco® Model CR-1000 Series of coffee roasters allow the user to specify the roasting time of the coffee beans in order to achieve the desired roasting result. Other roasting apparatuses offer control over the roasting process by allowing the user to specify the roasting temperature. However, as indicated above, it has been found that the desired roasting degree cannot be consistently achieved by simply defining a roasting time and/or temperature.

SUMMARY OF THE INVENTION

The present invention seeks to provide a coffee roasting apparatus that may produce roasted coffee beans in a more consistent manner.

The present invention further seeks to provide a coffee brewing apparatus comprising such a coffee roasting apparatus.

The present invention yet further seeks to provide a method of controlling a coffee bean roasting process to produce coffee beans that are roasted in a more consistent manner.

According to an aspect, there is provided a coffee roasting apparatus comprising a compartment for holding coffee beans; a roasting element for directing a heated air flow through said compartment; a particulate matter sensor for detecting a peak amount of particulate matter in said air flow; and a controller arranged to control said roasting element, wherein the controller is adapted to select a defined control time for said roasting element as a function of an amount of time lapsed from the start of the roasting process until the detection of said peak amount; and apply the defined control time to said roasting element after first cracking of the coffee beans to complete the roasting of the coffee beans.

The coffee roasting process can be divided in a number of stages including a drying stage of the coffee beans followed by one or more cracking stages of the coffee beans depending on the required degree of roasting. One of the particular challenges in achieving a consistent degree of roasting of the coffee beans is that the point of first cracking varies in time, as does the required completion time following first cracking. The present inventors have gained the insight that the required completion time of the roasting process following first cracking can be accurately predicted from the behaviour of the coffee beans during the drying phase preceding the first cracking phase. In particular, the point in time after initiating the roasting process at which a peak concentration in the particulate matter emitted by the coffee beans is detected is indicative of the internal temperature of the beans, given that peak emission of particulate matter from the beans typically occurs at a temperature of about 110° C., when the free water in the coffee beans starts to evaporate therefrom. Consequently the point in time at which the coffee beans reach this internal temperature provides an indication of the ability of the coffee beans to absorb heat, which is a critical parameter in setting a completion time for the roasting process from the point of first cracking of the coffee beans. Therefore, the detection of the point in time at which the peak emission of particulate matter occurs can be used to select the appropriate completion time for the roasting process from the point of first cracking. It has been found that a particulate matter sensor arranged to detect particles having an average size in the range of 0.3-0.5 μm is particularly suitable to accurately detect this peak emission.

The coffee roasting apparatus may further comprise a memory accessible to the controller, said memory storing a plurality of defined control times such that the controller can look up the appropriate control time as a function of the determined point in time of the peak particulate matter emission for the purpose of controlling the coffee bean roasting process following first cracking in a consistent manner.

In order to determine the point in time at which this peak emission occurs, the coffee roasting apparatus may further comprise a timer for determining the lapsed amount of time, the controller being responsive to said timer. The timer may form part of the controller or may be separate to the controller, and may further be used to control the completion of the roasting process in accordance with the defined amount of time selected as a function of the detected peak emission of particulate matter.

The coffee roasting apparatus may further comprise a user interface for defining a desired roasting level, wherein the controller is further adapted to further select the defined control time as a function of said defined desired roasting level. In this manner different degrees of roasting as specified by a user can be achieved in a consistent manner between different batches of coffee beans.

In an embodiment, the coffee roasting apparatus further comprises a first cracking detection sensor, wherein the controller further is responsive to said first cracking detection sensor in order to accurately detect the occurrence of the first cracking stage of the coffee bean roasting process such that the start of the determined time period for completing the roasting process can be accurately determined, thereby providing a particularly consistent coffee bean roasting process.

The first cracking detection sensor may be arranged to detect a rate of change in an amount of said particulate matter in said air flow, said rate of change being indicative of said first cracking. For instance, the first cracking detection sensor may be arranged to detect particles having an average size in the range of 0.5-1.0 μm, as such sized particles show a particular correlation with the occurrence of the first cracking stage. In a particularly advantageous embodiment, the particulate matter sensor comprises the first cracking detection sensor, which obviates the need for an additional sensor in the coffee roasting apparatus thus reducing overall cost.

Alternatively, the first cracking detection sensor may be arranged to detect a change in the volume occupied by the coffee beans in said compartment, said change in volume being indicative of said first cracking.

Alternatively, the first cracking detection sensor may be arranged to detect a rate of change of the total concentration of volatile organic compounds released by the coffee beans, said rate of change being indicative of said first cracking.

Alternatively, the first cracking detection sensor may be arranged to detect a cracking sound of said coffee beans, said cracking sound being indicative of said first cracking.

Alternatively, the first cracking detection sensor may be arranged to detect a weight change of the coffee beans, said weight change being indicative of said first cracking.

Other suitable sensors for determining the point of first cracking may also be used.

In accordance with another aspect, there is provided a coffee brewing apparatus including the coffee roasting apparatus according to one or more of the aforementioned embodiments. Such a coffee brewing apparatus benefits from the improved consistency of the coffee roasting apparatus, thereby providing a coffee brewing apparatus that can brew coffee with an improved consistency in taste.

According to yet another aspect, there is provided a method of controlling a coffee bean roasting process, comprising detecting a peak amount of particulate matter released by said coffee beans during the roasting process; determining an amount of time lapsed from the start of a roasting process until the detection of said peak amount; selecting a defined roasting time for said coffee beans from the determined amount of time; detecting the first cracking of said coffee beans during the roasting process; and completing the roasting of said coffee beans from said first cracking according to the selected defined roasting time. Such a method is capable of producing roasted coffee beans in a particularly consistent manner, providing excellent control over the level of roasting of the coffee beans.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

Figure 1:
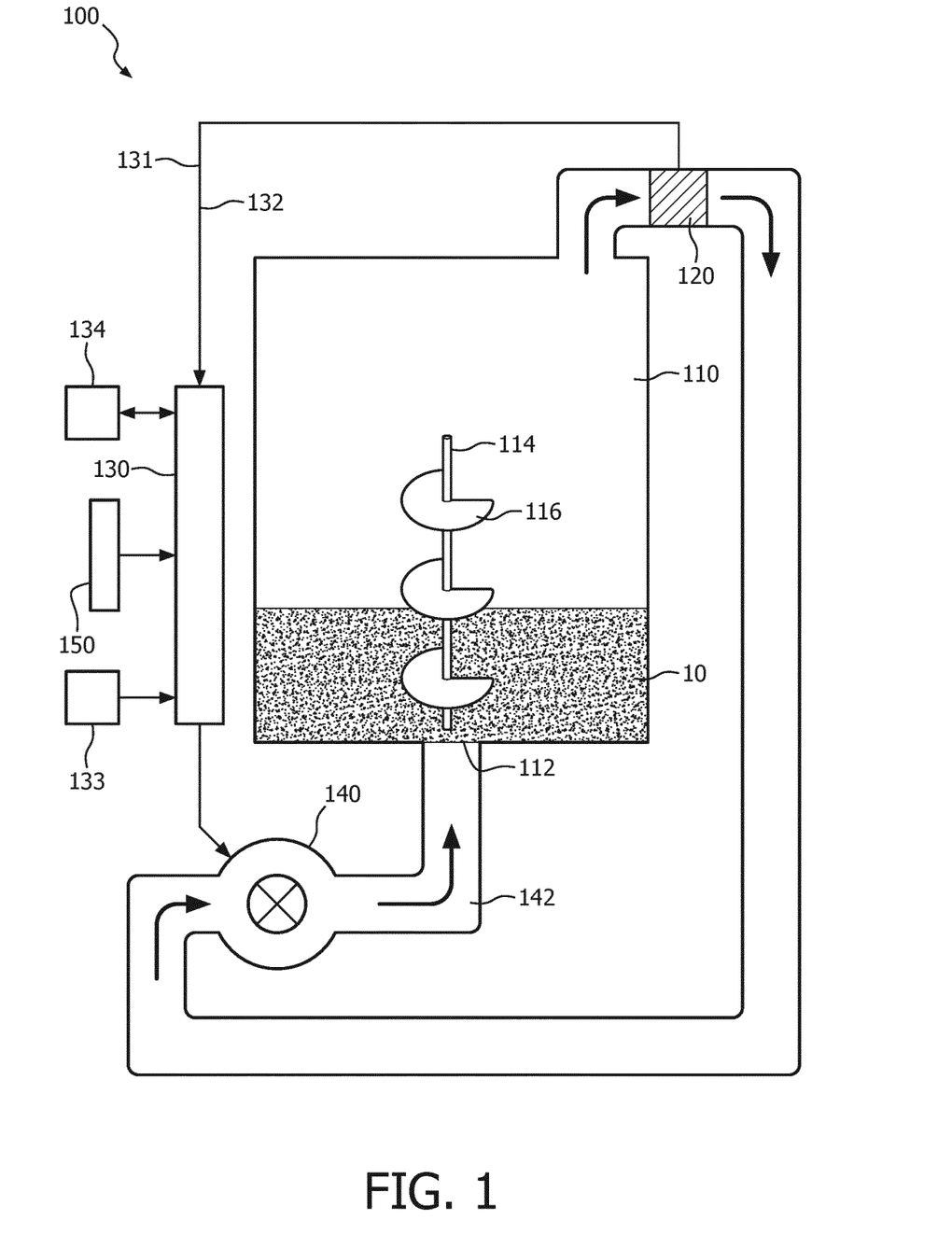
FIG. 1 schematically depicts a coffee roasting apparatus according to an embodiment.

FIG. 1 schematically depicts a coffee roasting apparatus 100 according to an embodiment. The coffee roasting apparatus 100 typically comprises a compartment 110 for storing coffee beans 10 therein. The compartment 110 may further comprise a stirring arrangement including stirring members, e.g. agitating blades, 116 mounted on or otherwise affixed to a stirring bar 114 to stir the coffee beans 10 during the roasting process of the coffee beans. This stirring arrangement assists in ensuring a homogeneous roasting of the coffee beans 10 in the compartment 110. The stirring arrangement may be controlled in any suitable manner, for instance by a controller 130, which controller will be explained in further detail below.

The coffee roasting apparatus 100 typically further comprises a roasting element (not shown) for roasting the coffee beans 10 in the compartment 110. The coffee roasting apparatus 100 further comprises a heating arrangement 140 for heating the coffee beans 10 during the roasting process. In an embodiment, the heating arrangement 140 may be controlled by the controller 130. The heating arrangement 140 ensures that the coffee beans 10 are heated to an appropriate temperature at which the roasting of the coffee beans 10 takes place, i.e. an appropriate temperature at which the desired chemical reactions such as the Maillard reaction and pyrolytic reactions take place. In FIG. 1, the heating arrangement 140 is embodied by a hot air generator connected to an inlet 112 of the compartment 110 via a conduit 142 by way of non-limiting example only. In this embodiment, the inlet 112 is typically arranged such that the hot air is guided through the coffee beans 10 during the roasting process, e.g. when stirring the coffee beans 10 using the stirring arrangement. The inlet 112 may comprise a fine grid or the like to prevent coffee beans 10 from entering the conduit 142. The heating arrangement 140 may comprise an air recirculation conduit 142 connected to the compartment 110 and the hot air generator for recirculating the air through the compartment 110 and the hot air generator.

However, it should be understood that any suitable heating arrangement for heating the coffee beans 10 may be used, such as one or more heating elements attached to or integrated into the one or more walls of the compartment 110, in which case the inlet 112 may be omitted. In such an embodiment an air flow generator may be present to circulate the air heated by the heating element(s) through the compartment 110, to facilitate a more even roasting of the coffee beans 10. As such heating arrangements are well-known per se, they will not be explained in further detail for the sake of brevity only.

The controller 130 is adapted to control the heating arrangement at least partially in response to the point in time during the roasting process at which a peak concentration of particulate matter released by the coffee beans 10 residing in the compartment 110 is detected, in particular particles having a mean diameter of 0.3-0.5 µm.

In an embodiment, in order to facilitate such a control mechanism, the coffee roasting apparatus 100 may comprise a sensor 120 for detecting such a particular matter concentration in the compartment 110. Such sensors are well-known per se and are therefore not explained in further detail for the sake of brevity only. Any suitable particulate matter sensor may be used as the sensor 120. In an embodiment, the sensor 120 is at least adapted to detect particles having a mean diameter of 0.3-0.5 µm.

Figure 2:
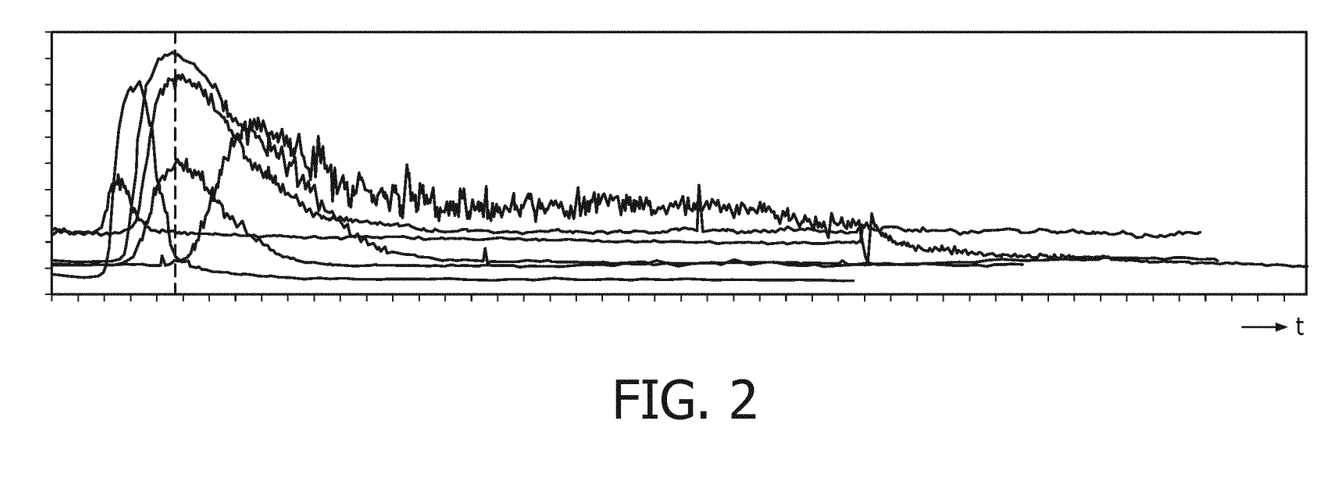
FIG. 2 schematically depicts an operating principle on which the coffee roasting apparatus of the present invention is based.

The operating principle of the coffee roasting apparatus will be explained in further detail with the aid of FIG. 2, which depicts experimental results of the emission of particles having a mean diameter of 0.3 µm by different types of green coffee beans. In these experiments, different weights (30, 60 and 120 g) of different types of coffee beans (Yirgacheffe and Mandheling) of different degrees of pre-roasting were subjected to identical roasting conditions using a Nesco roaster. The dashed vertical line in FIG. 2 indicates the point in time after initiating the roasting process at which the peak emission of particulate matter occurred for the various batches of coffee beans of 60 g weight. Batches of smaller weight typically exhibited peak emissions of particulate matter at an earlier point in the roasting process, whereas batches of larger weight typically exhibited peak emissions of particulate matter at a later point in the roasting process. Although not evident from FIG. 2, variations in the point in time at which peak particulate matter occurred also varied between different batches having the same weight.

These experiments generally demonstrate that coffee beans having similar properties, e.g. weight and moisture content, have similar PM peak time. Other experiments have demonstrated that the peak emission of particulate matter, i.e. particles having a mean diameter of 0.3-0.5 µm occurs when internal bean temperature is around 110° C., which is when the free water in the coffee beans starts to evaporate from the beans. Therefore, the arrival time of peak emission of the particulate matter of interest is an indication of the bean internal temperature.

Figure 3:
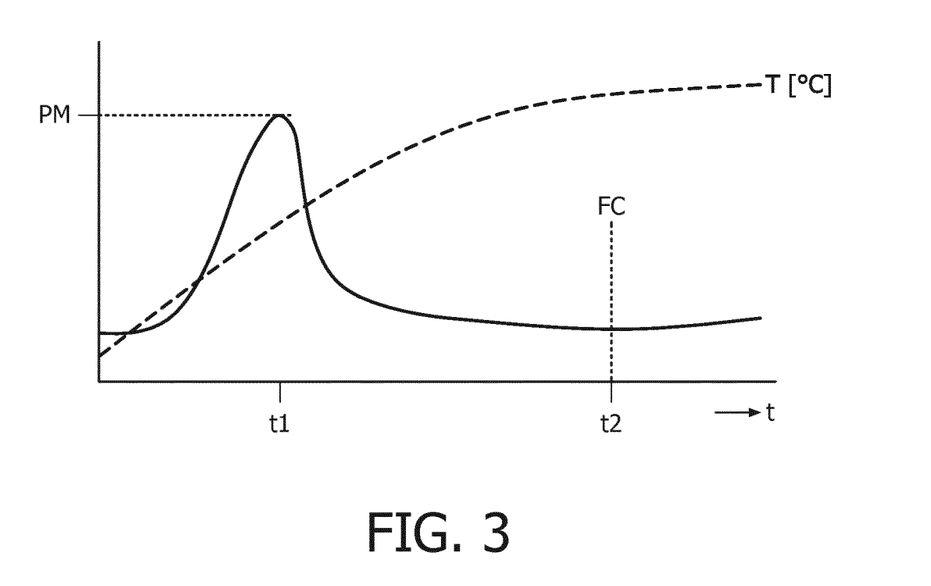
FIG. 3 schematically depicts a particular aspect of the operating principle depicted in FIG. 2.

During the drying phase, the internal bean temperature continues to rise until the first cracking phase of the coffee beans at t=t2, at which point the internal bean temperature is around 180° C. FIG. 3 schematically depicts the relation between the arrival time of the peak emission (labeled PM) of the particulate matter during the drying phase at point t1 and the bean internal temperature, indicated by the dashed line. The measured concentration of particulate matter in the coffee roasting apparatus is depicted by the solid line. FIG. 3 further shows the delay between the arrival time of dehydration PM peak and the time of first cracking t2, which is related to the internal bean temperature as mentioned above. The arrival time of dehydration PM peak reflects the speed of temperature increase of the coffee beans from normal room temperature to 110° C.

J. A Hernandez et al. in the Journal of Food Engineering 78 (2007) pages 1141-1148 disclose that the temperature change of the coffee beans is related to the weight, moisture content of beans and the heat capacity of the coffee beans as per formula (1):

$$\frac{dT_b}{dt} = \frac{GC_{pa}[T_{ae} - T_{as}] - Q_{a \to m} + Q_{m \to b} + m_{bs}\left(Q_r + L_v \frac{dX}{dt}\right)}{m_{bs}(1 + X)C_{pb}} \quad (1)$$

Wherein Tb is the bean temperature, $m_{bs}$ is the weight of the beans, X is the moisture content of the coffee beans and $C_{pb}$ is the heat capacity of the coffee beans. The other parameters in formula (1) relate to the sum of the energy transferred to the coffee beans. In short, this formula indicates that the temperature change of the coffee beans is influenced by the energy input of the heating arrangement into the coffee beans, coffee bean weight, coffee bean moisture content and the heat capacity of the coffee beans.

For a given roasting apparatus applying a given heating profile, the energy input is fixed, i.e. largely independent of the coffee beans to be roasted, as the heat capacity of different green coffee beans is similar regardless of the type of coffee beans. This allows formula (1) to be rewritten as formula (2):

$$dTb/dt = f(m_{bs}, X, C_{pb}) \quad (2);$$

and $$t = F(m_{bs}, X, Cpb, Tb) \quad (3)$$

Formula (3) shows that the arrival time of the peak emission of particulate matter by the coffee beans during drying depends from key parameters of the coffee beans, i.e. weight, moisture content and heat capacity. For a given batch of roasting, these parameters are fixed, but for different batches these parameters may change, causing a change in t1, i.e. the point in time at which the peak emission of particulate matter occurs, that is, the length of the time period between the start of the roasting process and t1 may vary. Hence, the point in time at which t1 occurs is a function of the properties of the coffee beans property and provide an indication of the rate at which the coffee beans absorb the heat produced by the heating arrangement of the coffee roasting apparatus 100. As the heat absorption rate is a key parameter in the time required completing the roasting process from first cracking, this information can be used to control the roasting process following first cracking by selecting a completion time for the roasting process based on the point in time t1 at which the peak emission of particulate matter by the coffee beans 10 is detected, i.e. the amount of time elapsed between the start of the roasting process and the occurrence of t1.

It is important to note that the weight of the coffee beans 10 does not require determining for this approach, as it is the product of the intrinsic heat capacity of the coffee beans 10 and the total weight of the coffee beans 10 in the coffee roasting apparatus that is indicative of the required completion time of the roasting process. In other words, variation in any of these two parameters will affect the occurrence of t1 and the associated required completion time of the roasting process in the same manner, such that this required completion time can be estimated from the point in time at which t1 occurs without requiring the individual determination of the intrinsic heat capacity and weight of the coffee beans 10.

To this end and returning to FIG. 1, the controller 130 is responsive to the sensor 120 and adapted to control the heating arrangement 140 in response to the peak emission of particulate matter, e.g. particles having a mean diameter of 0.3-0.5 pm. The sensor 120 is typically conductively coupled to the controller 130 through a conductive connection 131 over which the sensor 120 provides the controller 130 with a sensor reading indicative of the monitored levels of particulate matter in the air flow through the compartment 110. The sensor reading may be a processed sensor reading, i.e. processed by the sensor 120, such that it directly reflects the measured particulate matter levels, or may be a raw sensor signal that is processed by the controller 130 to derive the measured particulate matter levels from the raw sensor signal. In an embodiment, the controller 130 is responsive to a timer 133 such that the controller 130 can determine the point in time t1 at which the peak emission of particulate matter is detected by the sensor 120. The timer 133 may be external to the controller 130 or may form part of the controller 130. In an embodiment, the timer 133 may form part of the sensor 120, in which case the sensor 120 may provide the controller 130 with an indication of t1 rather than a sensor reading. Alternative feasible implementations of the timer 133 will be immediately apparent to the skilled person.

The controller 130 may have access to a non-volatile data storage element 134 that stores a set of roasting completion times from the point t2 of first cracking to be applied to the heating arrangement, with the completion times being a function of t1. Any suitable non-volatile data storage element 134 may be used for this purpose, e.g. a ROM, EEPROM, flash memory and so on. The controller 130 is typically adapted to look up the appropriate roasting completion time, i.e. the duration of the remaining roasting process of the coffee beans 10 from time of first cracking t2 and control the heating arrangement in accordance with the selected roasting completion time once t2 has been determined or estimated. The non-volatile data storage element 134 may be a separate data storage element or may form part of the controller 130.

Table 1 is a non-limiting example of such a look up table for storing in the data storage element 134. The data in such a look up table may be determined empirically, e.g. by experiments involving a variety of coffee beans from different batches. As shown in Table 1, the required roast completion time may further be a function of the initial condition of the coffee beans 10 to be roasted, e.g. green beans or partially roasted beans. Such initial condition may be specified by the user or may be determined by the roasting apparatus 100 in some embodiments, as will be explained in more detail below.

TABLE 1

| | Roast completion time from t2 (s) |
|---|---|
| Green beans | |
| t1 (s) | |
| 120 | 60 |
| 160 | 75 |
| ... | ... |
| 390 | 210 |
| Partial level 1 | |
| t1 (s) | |
| 120 | 50 |
| 160 | 65 |
| ... | ... |
| 390 | 180 |
| Partial level 2 | |
| Roast completion time from t2 (s) | |
| 120 | 30 |

The coffee roasting apparatus 100 may include a user interface 150 for allowing a user to specify personal roasting preferences, e.g. a degree of roasting such as a light roast or a dark roast, and/or to specify the initial condition of the coffee beans 10 before roasting, e.g. green coffee beans or partially roasted coffee beans, optionally further specified by a degree or level of partial roasting as indicated in the non-limiting example look up table depicted in Table 1. The controller 130 may be responsive to such a user interface 150, which may be implemented in any suitable manner, e.g. by one or more of a dial, a series of buttons, a programmable display, which may be a touch-screen display, and so on. Any suitable type of user interface 150 may be used for this purpose.

In order to be able to complete the roasting process in accordance with the selected duration for this completion as a function of the determined peak emission of the particulate matter by the coffee beans 10, the controller 130 must be aware of the occurrence of the first cracking of the coffee beans 10, i.e. must be aware of the point in time at which t2 occurs. This may be achieved in a number of ways. In a particularly simple approach, the controller 130 may be adapted to estimate t2 from the occurrence of t1 as the amount of time it has taken to heat the coffee beans 10 to a temperature of about 110° C. can be used to extrapolate to the point in time at which it may be expected that the coffee beans 10 will reach a temperature of about 180° C., around which the first cracking usually occurs. However, although this approach improves roasting consistency, some inconsistency still remains due to the fact that the point in time (t2) at which first cracking occurs can vary, for instance because of variations in the moisture content in the coffee beans 10.

For this reason, it is preferable for the coffee roasting apparatus 100 to further include a further sensor for detecting the actual point in time at which first cracking occurs, with the controller 130 being further responsive to this further sensor such that the point in time at which the controller 130 should start controlling the heating arrangement in accordance with the time period selected from the data storage element 134 as a function of the point in time at which the peak emission of particulate matter from the coffee beans 10 was detected can be accurately determined. Several suitable embodiments of such a further controller may be contemplated.

In FIG. 1, the particulate matter sensor 120 may be configured to further detect a peak emission of particulate matter having a mean diameter of 0.5-1.0 µm, as the inventors have realized that of the coffee beans 10 tend to release particles in such size range when cracking open during the first cracking phase of the roasting process. To this end, the sensor 120 may provide a separate sensor signal indicative of the peak emission of particulate matter having a mean diameter of 0.5-1.0 µm over a conductive connection 132 with the controller 130, which may be the same connection as conductive connection 131 or may be a separate connection. As before, this separate sensor signal may be pre-processed by the sensor 120 or may be a raw signal to be processed by the controller 120.

Figure 4:
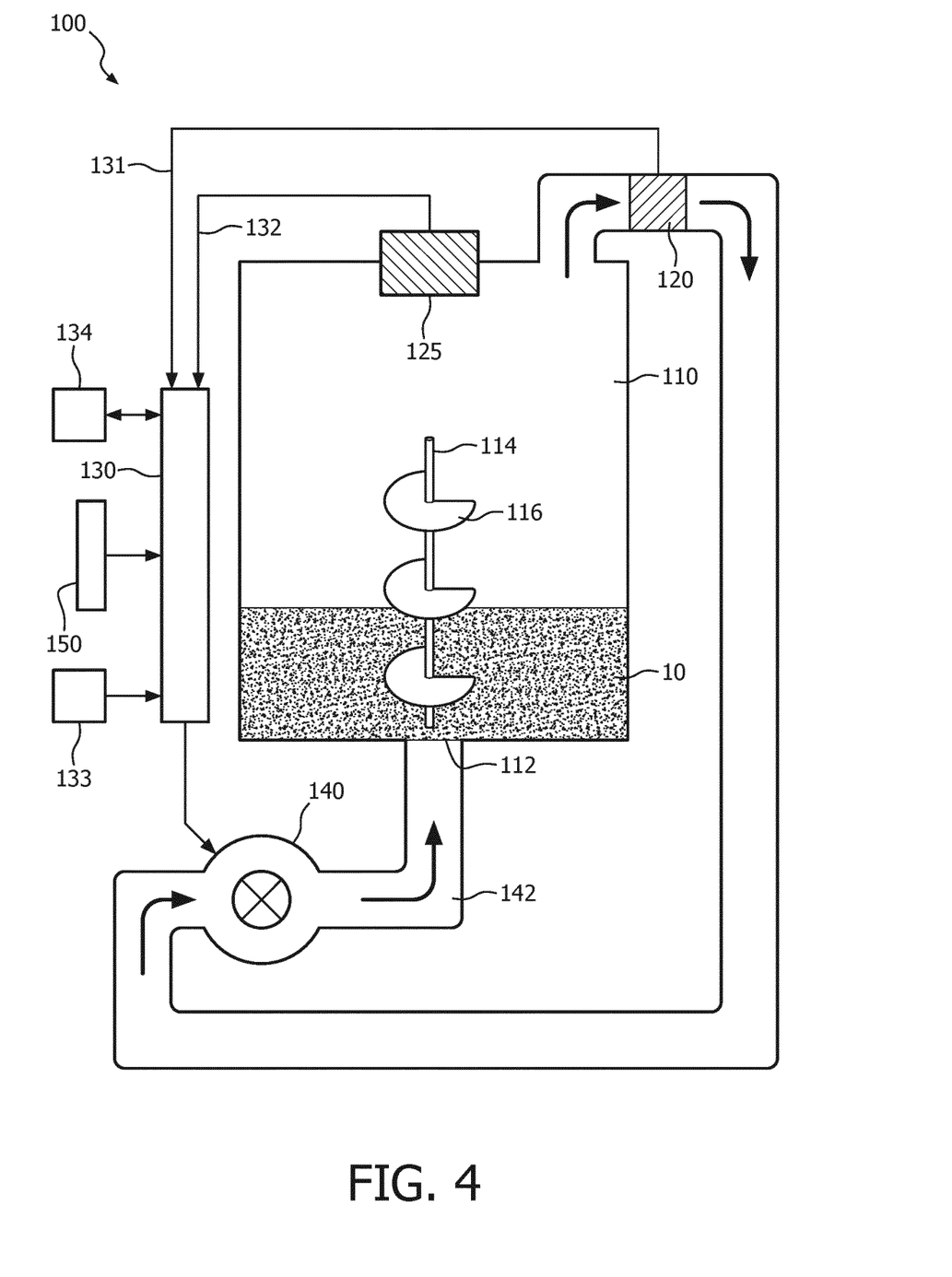
FIG. 4 schematically depicts a coffee roasting apparatus according to another embodiment.
Figure 5:
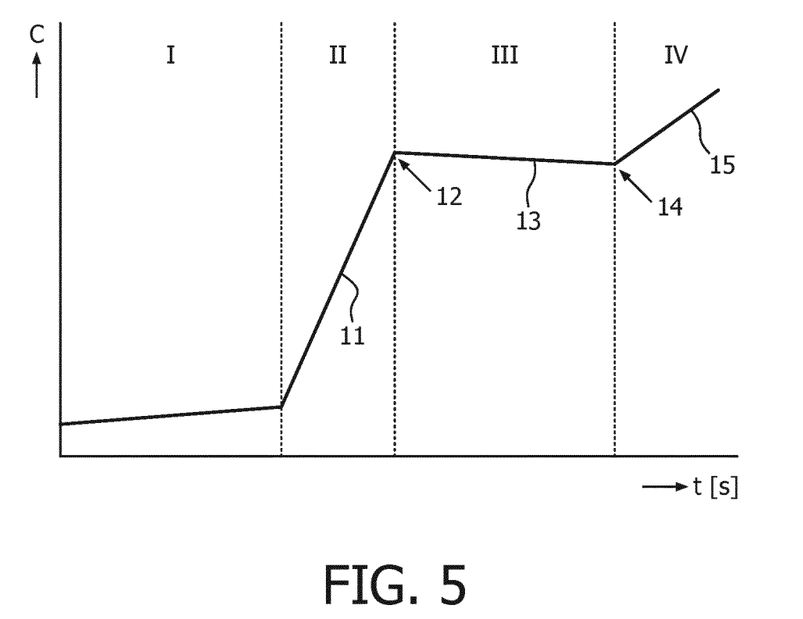
FIG. 5 schematically depicts a particular operating principle on which the coffee roasting apparatus of FIG. 4 is based.

FIG. 4 schematically depicts an example alternative embodiment of the coffee roasting apparatus 100, in which the coffee roasting apparatus comprises a separate further sensor 125 for detecting the first cracking phase, with the controller 130 being responsive to the further sensor 125 in order to initiate the completion of the roasting process in accordance with the set time period retrieved from the data storage element 134 as previously explained. In FIG. 4, the further sensor 125 is a volatile organic compound sensor as the inventors have previously realized that the first cracking phase causes a change in the rate at which the total concentration of VOCs in the compartment 110 varies. This is depicted in FIG. 5, which schematically depicts a typical VOC release curve during a roasting process of coffee beans 10. The VOC release curve expresses the total concentration C of VOCs in the compartment 110 as a function of roasting time t. The curve can be divided into four distinct regions. The first region I is typically associated with the drying phase of the coffee beans 10, during which the VOCs concentration in the compartment 110 is typically close to zero, and may increase only slightly if at all until the coffee beans enter the first cracking phase identified by region II, in which the VOC concentration in the compartment 110 rapidly increases as indicated by segment 11 of the VOC release curve, i.e. the rate of change of the total VOC concentration increases. Upon completion of the first cracking phase as indicated by point 12 in the VOC release curve, the rate of increase of the total VOC concentration in the compartment 110 is significantly reduced and may reach a zero or even slightly negative value during the third region as indicated by segment 13 of the VOC release curve. This steady state in the total VOC concentration is typically maintained until the coffee beans 10 enter the second cracking phase identified by point 14 in the VOC release curve, which second cracking phase as identified by region IV of the VOC release curve is typically characterized by a marked increase in the total VOC concentration in the compartment 110, as indicated by section 15.

The controller 130 may for instance be adapted to identify the start of the first cracking phase by monitoring the change in the total VOC concentration from the sensor readings provided by VOC sensor 120 in order to identify the start of the first cracking phase. The controller 130 may for instance compare the rate of change of the total VOC concentration against a defined threshold, and upon the rate of change of the total VOC concentration exceeding this defined threshold, the controller 130 may complete the further roasting process in a predetermined manner as previously explained.

Figure 6:
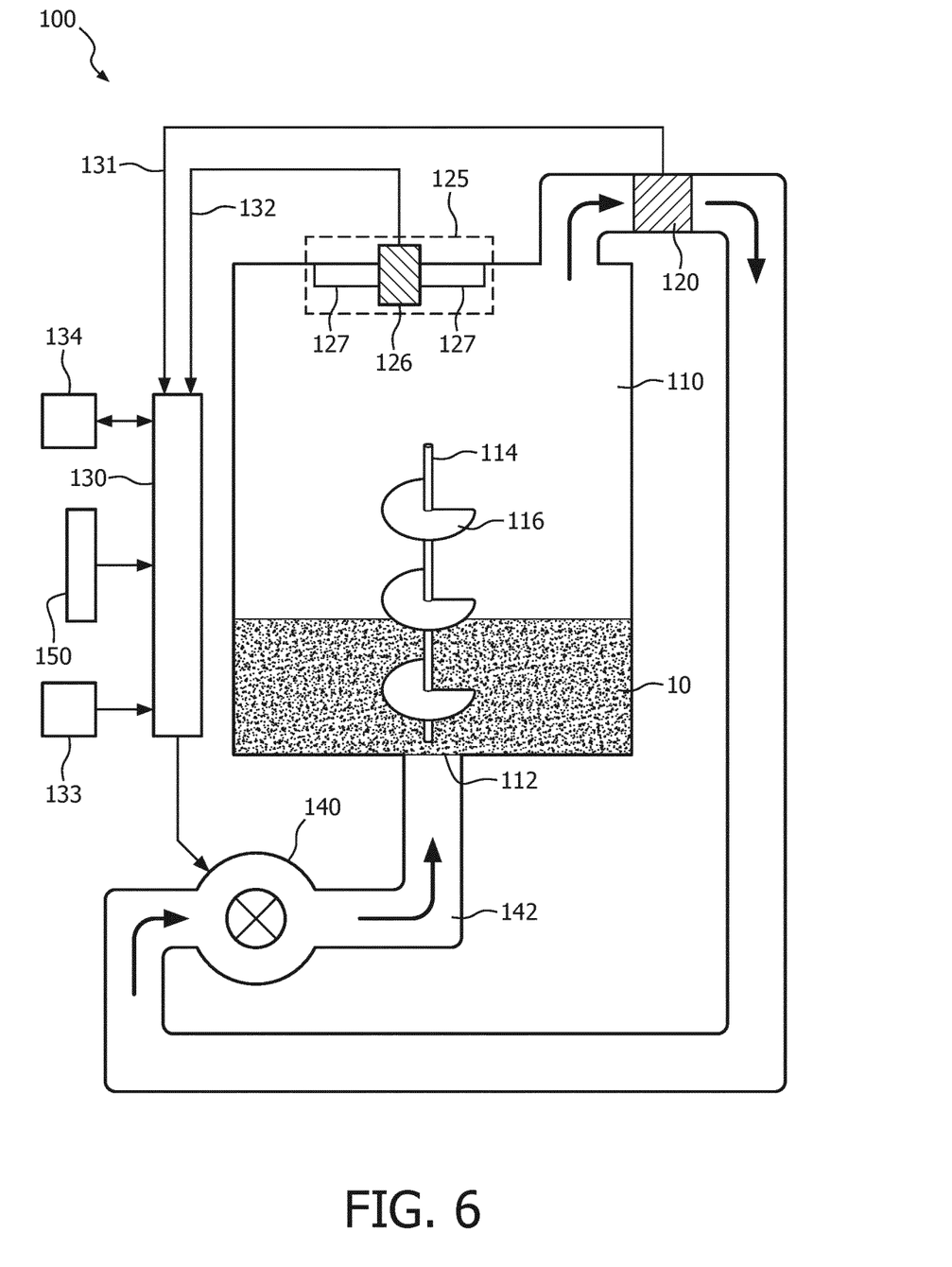
FIG. 6 schematically depicts a coffee roasting apparatus according to yet another embodiment.

FIG. 6 schematically depicts another example alternative embodiment of the coffee roasting apparatus 100, in which the coffee roasting apparatus comprises a separate further sensor 125 for detecting the first cracking phase, with the controller 130 being responsive to the further sensor 125 in order to initiate the completion of the roasting process in accordance with the set time period retrieved from the data storage element 134 as previously explained. In FIG. 6, the further sensor 125 is a sensor for detecting a fill level of the container 110 as the inventors have previously realized that the first cracking phase causes a change in this fill level. In particular, the coffee beans 10 expand during first cracking, thereby causing a relatively sudden increase in the fill level of the coffee beans 10 in the compartment 110, which sudden increase may be used as an indicator of the point in time t2. The further sensor 125 for instance may comprise a transducer 126 for transmitting a signal into the compartment 110 towards the coffee beans 10 and a receiver 127 for receiving an echo of the transmitted signal reflected by the upper coffee beans 10 in the compartment 110, wherein the further sensor 125 is typically arranged to detect the time of flight of the transmitted signal, which time of flight is a direct correlation to the unoccupied head space in the compartment 110 and can therefore be directly correlated to the volume of the compartment 110 occupied by the coffee beans 10. A sudden change (increase) in the volume occupied by the coffee beans 10 can be related to the occurrence of the first cracking phase.

Figure 7:
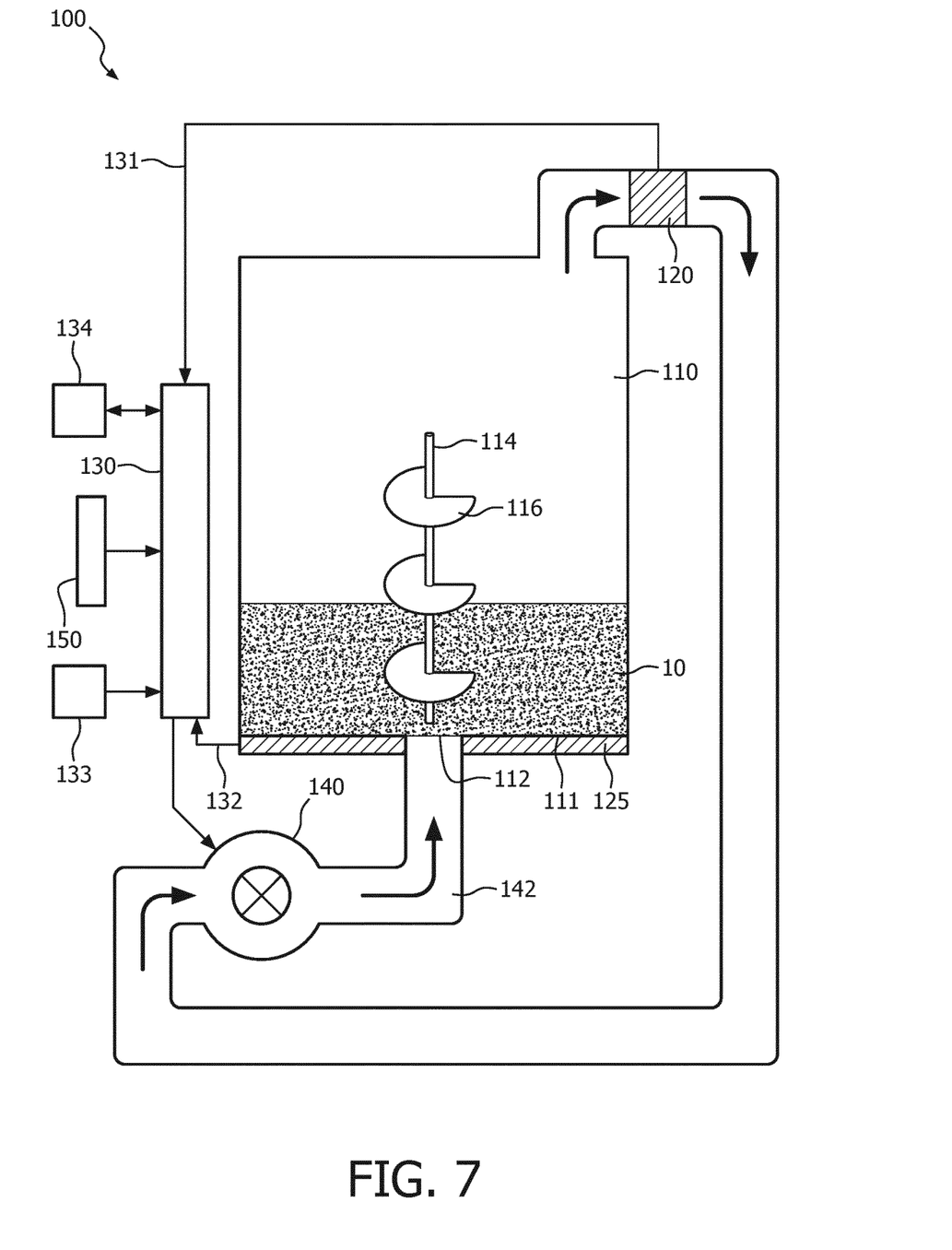
FIG. 7 schematically depicts a coffee roasting apparatus according to yet another embodiment.

FIG. 7 schematically depicts another example alternative embodiment of the coffee roasting apparatus 100, in which the coffee roasting apparatus comprises a separate further sensor 125 for detecting the first cracking phase, with the controller 130 being responsive to the further sensor 125 in order to initiate the completion of the roasting process in accordance with the set time period retrieved from the data storage element 134 as previously explained. In FIG. 7, the further sensor 125 is a sensor for detecting the weight of the coffee beans 10 in the compartment 110 as the inventors have previously realized that the first cracking phase causes a sudden weight loss in the coffee beans 10 due to the release of moisture and gases from the coffee beans 10 during first cracking. The further sensor 125 may cooperate with the floor 111 of the compartment 110, e.g. the further sensor 125 may include a resilient element, e.g. a spring or the like, which compression is a function of the load on the floor 111. The degree of compression may be measured to determine this load, i.e. the weight of the coffee beans 10. Other suitable embodiments of such a weight sensor will be apparent to the skilled person. As such weight determination sensors are well-known per se, this will not be explained in any further detail for the sake of brevity. It suffices to state that any suitable weight sensor may be used for this purpose.

Moreover, the inventors have previously found that the weight loss of the coffee beans 10 is characteristic for the degree of roasting of the coffee beans 10. In other words, different stages of the roasting process of the coffee beans 10 exhibit different weight loss characteristics, such that the determination of the weight loss characteristic at the initial stages of the operation of the coffee roasting apparatus 100, e.g. by means of the further sensor 125 allows for the identification of the degree of roasting of the coffee beans 10 placed in the compartment 110 of the coffee roasting apparatus 100.

Without wishing to be bound by theory, it is believed that coffee beans 10 at different partial roasting levels contain different amounts of moisture and have different densities. The drier the coffee beans 10, the more time is required for the coffee beans 10 to lose a certain amount of weight. For instance, the drier partially roasted coffee beans 10 will require more time to lose the same amount of weight compared to for instance green coffee beans 10 having higher moisture content, as it is easier to release a unit amount of moisture from the green coffee beans. Table 2 gives a typical moisture content of coffee beans at various levels of partial roasting. In Table I, p-1, p-2 and p-3 indicate different partial roasting degrees with a higher number indicating a higher level of partial roasting. A lower moisture content of the coffee beans 10 corresponds to the beans having a lower weight.

TABLE 2

| Partial roasting level | Moisture content (wt %) |
|---|---|
| p-3 | 3.20 |
| p-2 | 4.30 |
| p-1 | 7.70 |
| Green | 10-13 |

Figure 8:
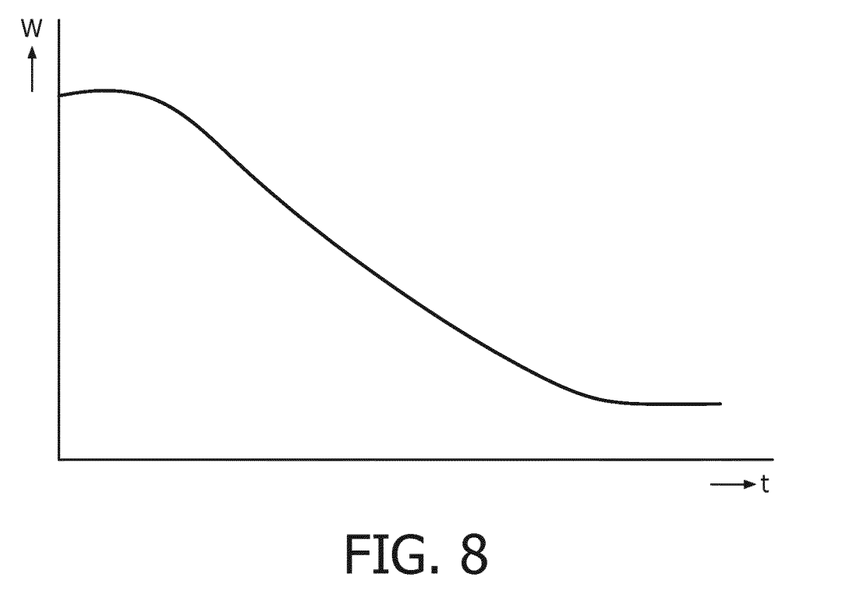
FIG. 8 schematically depicts a particular operating principle on which the coffee roasting apparatus of FIG. 7 is based.

This is further demonstrated in FIG. 8, which schematically depicts the change in weight W of the coffee beans 10 as a function of time t during a roasting process. Two trends are immediately apparent; firstly the coffee beans 10 gradually lose weight during the roasting process. It has been found that the degree of weight loss is reproducible and correlated to the degree of roasting of the coffee beans 10, such that the degree of pre-roasting can be determined by monitoring the weight loss in the coffee beans 10. Such a further sensor 125 may therefore further be used to determine the partial roasting degree of the coffee beans 10 to allow the controller 130 to select the appropriate completion time for the roasting process based on the determination of the point in time (t1) of the peak emission of particulate matter of the coffee beans 10 and their initial degree of roasting as explained above, for instance with the aid of Table 1.

It should be understood that the above embodiments are non-limiting examples of possible arrangements and that many other arrangements are equally suitable; for instance, even though the embodiment of the coffee roasting apparatus 100 as shown in FIGS. 1, 4, 6 and 7 has been explained using a discrete controller 130, it is equally feasible that at least some of the discrete components form part of a single arrangement. For instance, the controller 130 may form part of the sensor 120 and so on. Moreover, it should be understood that other further sensors for determining the point in time at which the first cracking phase occurred may be used, such as a sensor for detecting a cracking sound produced by the coffee beans 10 indicative of the occurrence of the first cracking phase. Any suitable sensor for detecting the first cracking phase may be contemplated.

The coffee roasting apparatus 100 according to any of the above embodiments may be integrated in a coffee brewing apparatus further comprising a coffee bean grinder and a coffee brewing stage. For instance, the coffee brewing apparatus may be arranged to automatically transfer a portion of the roasted coffee beans into the coffee bean grinder for grinding, after which the ground coffee is automatically transported into the coffee brewing stage for brewing a fresh cup of coffee. As such coffee brewing apparatuses are well-known per se, this will not be explained in further detail for reasons of brevity only. It should be understood that the particular embodiment of such a coffee brewing apparatus is not critical to the present invention and that any suitable arrangement of such coffee brewing apparatus may be contemplated.

Figure 9:
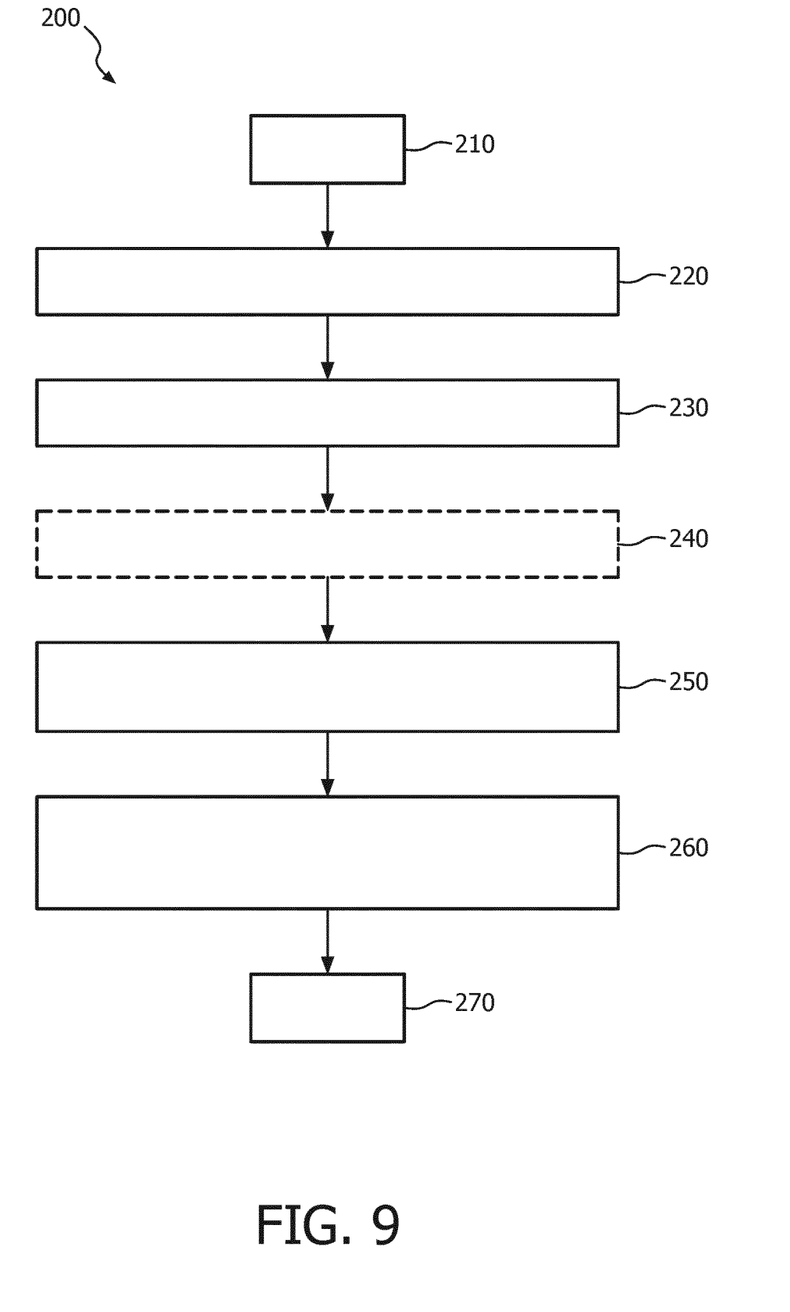
FIG. 9 depicts a flow chart of a method of controlling a coffee roasting apparatus of the present invention.

An example embodiment of a method 200 of controlling a coffee bean roasting process as implemented by a coffee roasting apparatus 100 according to the present invention will now be explained in further detail with the aid of FIG. 9, which depicts a flowchart of this example embodiment. The method starts in step 210 for instance with the switching on of the coffee roasting apparatus 100 and/or the filling of the compartment 110 with the coffee beans 10 to be roasted, a user optionally specifying an initial and/or desired degree of roasting of the coffee beans 10 and the commencement of the roasting process.

The method then proceeds to step 220 in which the amount of time elapsed between the commencement of the roasting process and the occurrence of the peak emission of particulate matter having a mean diameter in the range of 0.3-0.5 µm as previously explained, i.e. the occurrence of t1. Next, the point in time t2 of first cracking may be estimated or determined using a sensor for detecting the first cracking phase in step 230, which optionally may further include the detection of a partial degree of roasting in step 240, e.g. by monitoring a weight loss rate of the coffee beans 10 as explained above.

Next, the appropriate duration of the remainder of the roasting process is selected in step 250, e.g. by looking up this duration in a look up table in the data storage element 134, which appropriate duration may be a function of the determined t1 and if determined or otherwise specified, the partial roasting degree of the coffee beans 10. It should be understood that the selection of the roast completion time may also be performed before determining the occurrence of first cracking, in particular when the initial roasting degree of the coffee beans 10 is irrelevant or user-defined before initiating the roasting process.

The method 200 subsequently proceeds to step 260 in which the coffee beans 10 are roasted for the amount of time as determined in step 250 from first cracking in order to complete the roasting process of the coffee beans 10. Once the coffee beans 10 have been roasted in this manner, the method terminates in step 270.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:
1. A coffee roasting apparatus comprising:
a compartment for holding coffee beans;
a heating arrangement for directing a heated air flow through said compartment for heating the coffee beans during a roasting process of the coffee beans;

a particulate matter sensor for detecting a peak amount of particulate matter released by the coffee beans in said heated air flow;

a timer for determining an amount of time lapsed from a start of the roasting process until the detection of said peak amount of said particulate matter released by the coffee beans; and a controller arranged to control said heating arrangement, wherein the controller is adapted to:
select a defined control time for said heating arrangement as a function of the amount of time lapsed from the start of the roasting process until the detection of said peak amount of particulate matter released by the coffee beans; and
apply the defined control time to said heating arrangement after first cracking of the coffee beans to complete the roasting process of the coffee beans.

2. The coffee roasting apparatus of claim 1, further comprising a memory accessible to the controller, said memory storing a plurality of defined control times.

3. The coffee roasting apparatus of claim 1, wherein the controller is responsive to said timer.

4. The coffee roasting apparatus of claim 1, further comprising a user interface for defining a desired roasting level, wherein the controller is further adapted to select the defined control time as a function of said desired roasting level defined by the user interface.

5. The coffee roasting apparatus of claim 1, wherein the particulate matter sensor is arranged to detect particles having an average size in a range of 0.3-0.5 microns.

6. The coffee roasting apparatus of claim 1, further comprising a first cracking detection sensor, wherein the controller is further responsive to said first cracking detection sensor.

7. The coffee roasting apparatus of claim 6, wherein the first cracking detection sensor is arranged to detect a rate of change in an amount of said particulate matter in said heated air flow, said rate of change being indicative of said first cracking.

8. The coffee roasting apparatus of claim 7, wherein the first cracking detection sensor is arranged to detect particles having an average size in a range of 0.5-1.0 microns.

9. The coffee roasting apparatus of claim 7, wherein the particulate matter sensor comprises the first cracking detection sensor.

10. The coffee roasting apparatus of claim 6, wherein the first cracking detection sensor is arranged to detect a change in a volume occupied by the coffee beans in said compartment, said change in the volume being indicative of said first cracking.

11. The coffee roasting apparatus of claim 10, wherein the volume occupied by the coffee beans in said compartment corresponds to a time of flight of a signal transmitted towards the coffee beans.

12. The coffee roasting apparatus of claim 10, wherein the first cracking detection sensor is further arranged to:
transmit a signal into said compartment towards the coffee beans;
receive an echo of the signal transmitted and reflected by the coffee beans in said compartment; and
detect a time of flight of the signal transmitted based on the echo received, wherein the volume occupied by the coffee beans in said compartment corresponds to the detected time of flight.

13. The coffee roasting apparatus of claim 6, wherein the first cracking detection sensor is arranged to detect a rate of change of a total concentration of volatile organic compounds released by the coffee beans, said rate of change being indicative of said first cracking.

14. The coffee roasting apparatus of claim 13, wherein the controller is further adapted to:
determine whether said rate of change of the total concentration of the volatile organic compounds exceeds a predetermined threshold; and
control said heating arrangement based on a determination that said rate of change of the total concentration of the volatile organic compounds exceeds said predetermined threshold.

15. The coffee roasting apparatus of claim 6, wherein the first cracking detection sensor is arranged to detect a cracking sound of said coffee beans, said cracking sound being indicative of said first cracking.

16. The coffee roasting apparatus of claim 6, wherein the first cracking detection sensor is arranged to detect a weight change of the coffee beans, said weight change being indicative of said first cracking.

17. A coffee brewing apparatus including the coffee roasting apparatus of claim 1.

18. The coffee roasting apparatus of claim 1, wherein:
said compartment comprises an inlet;
said heating arrangement comprises a hot air source coupled to said inlet; and
the coffee roasting apparatus further comprises a stirring element mounted in said compartment for stirring the coffee beans during the roasting process.

19. A method of controlling a roasting process of coffee beans in a compartment of a coffee roasting apparatus, the method comprising:
directing a heated air flow through said compartment;
detecting a peak amount of particulate matter released by said coffee beans during the roasting process;
selecting a defined roasting time for said coffee beans as a function of an amount of time lapsed from a start of the roasting process until the detection of said peak amount of particulate matter; and
applying the defined roasting time after first cracking of the coffee beans to complete the roasting process of the coffee beans.

* * * * *